United States Patent [19]
Kallenbach

[11] Patent Number: 5,934,423
[45] Date of Patent: *Aug. 10, 1999

[54] PIPE RESTRAINT AND METHOD FOR USING THE SAME

[75] Inventor: Ralph M. Kallenbach, Elgin, Ill.

[73] Assignee: Sargent & Lundy, Chicago, Ill.

[ * ] Notice: This patent is subject to a terminal disclaimer.

[21] Appl. No.: 08/681,077

[22] Filed: Jul. 22, 1996

Related U.S. Application Data

[63] Continuation-in-part of application No. 08/441,138, May 15, 1995, Pat. No. 5,588,511.

[51] Int. Cl.⁶ .................................................. F16F 7/12
[52] U.S. Cl. .......................... 188/374; 188/67; 188/134; 248/58; 248/613; 248/610
[58] Field of Search ..................... 188/136, 381, 188/129, 67, 371–377, 321.11, 378–380; 403/220, 221; 248/548, 49, 58, 610, 613, 60, 59; 376/285, 286, 234; 976/DIG. 129, DIG. 294; 138/106, 107; 52/167.1, 167.8; 267/134, 162, 196–207; 293/133; 74/492

[56] References Cited

U.S. PATENT DOCUMENTS

| | | | |
|---|---|---|---|
| 1,991,684 | 2/1935 | Ketel . | |
| 2,437,631 | 3/1948 | Wood | 248/613 |
| 2,621,005 | 12/1952 | Turpoh | 248/613 |
| 2,905,415 | 9/1959 | Sundahl | 248/613 |
| 2,908,491 | 10/1959 | Suozzo | 267/136 |
| 2,965,343 | 12/1960 | Sherburne et al. | 248/610 |
| 3,292,917 | 12/1966 | Sherburne | 267/162 |
| 3,354,991 | 11/1967 | Kenworthy . | |
| 3,450,233 | 6/1969 | Massa . | |

(List continued on next page.)

FOREIGN PATENT DOCUMENTS

| | | | |
|---|---|---|---|
| 2825499 | 12/1979 | Germany | 188/134 |
| 3522449 | 1/1987 | Germany . | |
| 61-233235 | 10/1986 | Japan | 188/134 |

OTHER PUBLICATIONS

Bush et al., "Aging and Service Wear of Hydraulic and Mechanical Snubbers Used on Safety–Related Piping and Components of Nuclear Power Plants," NUREG/CR–4279, PNL–5479, vol. 1.

Goodling et al., "The Disc Spring Pipe Restraint," Reprinted from The 1988 ASME Pressure Vessels and Piping Conference, Pittsburgh, PA, Jun. 19–23, 1988, ASME PVP vol. 144, pp. 187–192.

"Selected Publications on the Application of WEAR™ Pipe Restraints," ABB Impell Corporation, 1986–1992.

Grinnell Corporation Brochure, "Limit Stop," including draft paper entitled "McGuire Snubber Elimination Program" by Robert L. Cloud, James S.M. Leung, William H. Taylor and Robert L. Morgan, Jr.

"E–Bar Technical Product Brochure".

*Primary Examiner*—Douglas C. Butler
*Attorney, Agent, or Firm*—McDermott, Will & Emery

[57] ABSTRACT

A pipe restraint and methods for its use are disclosed. The pipe restraint includes a hollow cylindrical housing of varying diameter. A shaft having first and second wedges is received by the housing. The housing is attached to a fixed structural member, such as a wall and the shaft is attached to the pipe. Depending on the force being applied to the pipe, one of the wedges engages the housing at a point where the diameter changes. The housing's resistance to movement of the wedges varies between two points of differing diameter of the housing. In one embodiment a disc spring assembly is located at one end of the housing. In one method a gapped restraint is attached to a pipe and the size of the gap in the restraint is less than the anticipated movement of the pipe due to a static load.

15 Claims, 7 Drawing Sheets

U.S. PATENT DOCUMENTS

| | | |
|---|---|---|
| 3,482,653 | 12/1969 | Maki et al. . |
| 3,563,346 | 2/1971 | Bainbridge . |
| 3,643,765 | 2/1972 | Hanchen . |
| 3,865,356 | 2/1975 | Wossner . |
| 3,887,223 | 6/1975 | Bez . |
| 3,899,047 | 8/1975 | Maeda et al. . |
| 4,062,994 | 12/1977 | Millman et al. |
| 4,078,778 | 3/1978 | Hubweber . |
| 4,181,198 | 1/1980 | Lindberg . |
| 4,301,989 | 11/1981 | Kallenbach . |
| 4,407,395 | 10/1983 | Suozzo ................................. 188/134 |
| 4,511,114 | 4/1985 | Cawley ................................. 188/67 |
| 4,589,301 | 5/1986 | Griner . |
| 4,823,923 | 4/1989 | Moyer . |
| 4,838,033 | 6/1989 | Yamamoto et al. ................... 248/613 |
| 4,955,467 | 9/1990 | Kallenbach . |
| 4,978,133 | 12/1990 | Thorne et al. . |
| 4,988,081 | 1/1991 | Dohrmann . |
| 4,995,486 | 2/1991 | Garneweidner . |
| 5,018,700 | 5/1991 | Hardtke ................................. 248/613 |
| 5,131,115 | 7/1992 | Sarto . |
| 5,174,421 | 12/1992 | Rink et al. . |
| 5,314,161 | 5/1994 | Domanski et al. . |
| 5,497,858 | 3/1996 | Cloud et al. . |
| 5,588,511 | 12/1996 | Kallenbach ........................... 188/371 | ized designers must develop limit stops on a case-by-
PIPE RESTRAINT AND METHOD FOR USING THE SAME This application is a continuation-in-part of application no. 08/441,138 filed on May 15, 1995, now U.S. Pat. No. 5,588,511.

FIELD OF THE INVENTION

This invention relates in general to a restraint system and its method of use for pipes, conduits and other equipment and more particularly to a pipe restraint system and its method of use for restraint during the occurrence of dynamic events, especially due to seismic phenomena and static events, especially due to thermal expansion.

BACKGROUND OF THE INVENTION

Devices such as snubbers have been commonly applied in order to control dynamic excitation of piping systems from loads such as those caused by earthquakes. The intended function of these devices is to allow a pipe to move in order to accommodate normal operating conditions such as thermal movements, but to lock to prevent response to dynamic loading. Typically snubbers are either hydraulic or mechanical devices. Both types have experienced difficulties in service.

Mechanical snubbers often suffer damage to internal components which causes the snubbers to lock up and fail to accommodate free movement of the piping due to normal operational thermal cycling. This introduces the possibility of overloading of the piping and support system and the potential failure of the piping or the support system.

Hydraulic snubbers have the potential of leakage which could prevent them from adequately controlling the dynamic excitation of the piping. There is an additional record keeping complication with hydraulic snubbers because of the non-metallic components therein.

In nuclear power plants the history of failure of mechanical and hydraulic snubbers has led to a requirement for regularly scheduled inspection, testing and maintenance of all snubbers in a plant. These programs represent a significant financial burden to the owners of these power plants.

There have been efforts to provide simpler, more reliable substitute devices for snubbers in order to eliminate the costs of inspection, testing and maintenance programs. Among these approaches is the limit stop or gapped restraint. This type of device provides controlled limits within which the pipe can move freely to provide for normal operational movements but beyond which the pipe comes hard against a stop. It is generally true that when these devices bottom out due to dynamic loading, the impact loads on the device may be unacceptably high for the existing building structure.

Devices such as limit stops have been commonly applied in order to control static movement of piping systems from loading conditions such as those caused by temperature of the piping. The intended function of these devices is to allow a pipe to move to a predetermined point in order to accommodate normal operating conditions such as thermal movement, but to prevent movement beyond that point, in order to control or limit pipe stresses and loads on the supporting structure, such as turbine, boiler, and pump nozzles, to desired levels. Limit stops are commonly used in fossil power plants on critical piping where the pipe temperatures are very high (e.g., 10000° F. or more) and the thermal pipe movement is large (e.g., 10 inches or more). Limit stops used to date typically are made of structural steel members, and have the disadvantages of requiring excessive space in the plant, and of introducing friction loads into the piping and supporting structures. Particularly problematic are friction forces that result from axial pipe movement after the pipe has engaged the limit stop. Currently, designers must develop limit stops on a case-by-case basis. Frequently, the resulting limit stop designs introduce excessive, unpredictable loads on the equipment nozzles, since it is difficult to predict what pipe load is needed to overcome the frictional resistance of the steel frame.

SUMMARY OF THE INVENTION

The present invention eliminates the foregoing disadvantages in the art by providing in a system for limiting the movement of a pipe due to a dynamic or static event a load limiting device for restraining the pipe and adapted, in one embodiment, to be attached to the pipe at a point where the anticipated unrestrained movement due to a seismic or other dynamic event is greater than the normal unrestrained thermal movement of the pipe or the desired restrained thermal movement of the pipe, along an imaginary line parallel to the longitudinal axis of the device. The load limiting device is connected at one of its ends to the pipe and at the opposite end to a substantially immovable support structure, such as a wall. The device includes a housing defining a hollow cylindrical area having multiple diameters and a shaft at least partially received in the housing. The housing includes shoulders formed at points where the diameter of the hollow area changes. The shaft includes wedges that each engage one of the shoulders once a predetermined amount of relative force has been imparted between a shoulder and a wedge. The resistance to movement of the wedges varies in the area between two shoulders such that there is a first resistance in a region adjacent to one shoulder, a second resistance in a region adjacent the other shoulder and a third resistance in a region between the first two regions. The third resistance is substantially greater than the resistance in the other two regions.

In addition, the present invention provides a gapped restraint for use in a fossil fuel power plant where the gap of the restraint is less than the anticipated unrestrained thermal movement of a pipe at the location where the restraint is attached to the pipe.

One object of the present invention is to provide characteristics of a gapped restraint or limit stop with the added feature that the maximum impact load will be limited to a predetermined load.

Another object of the present invention is to provide a restraint that will yield at a specific load, thus limiting the load imparted to the object connected to the restraint, such as the existing building structure.

An additional object of the present invention is to provide protection to a pipe system, including connected valves and equipment, and components and equipment adjacent to and near the pipe, from excessive pipe movements due to a seismic or other dynamic event or due to a static event such as thermal expansion.

Still an additional object of the present invention is to provide a restraint having a compact size.

A further object of the present invention is to provide a restraint that is easy to install and adjust to a correct position.

Another object of the present invention is to limit response due to dynamic excitation in a pipe.

Still a further object of the present invention is to provide a gapped restraint with adjustable free travel and length to allow the restraint to be installed to suit field conditions and allow the gap thereof to be adjusted after installation.

An additional object of the present invention is to provide a restraint that is easy to service and inspect.

Another object of the present invention is to provide a restraint that eliminates slowly changing (i.e., static) applied friction force and moment loading on supporting structures.

Still another object of the present invention is to provide a restraint which minimizes shock to the piping system when loads are initially applied to the restraint but before plastic deformation of the device occurs.

Still an additional object of the present invention is to provide a restraint in which the amount of free movement in the device can easily be adjusted.

A further object of the present invention is to provide a standard product that will eliminate much of the engineering effort of custom designing a limit stop to control thermal movements at specific locations, reduce equipment and support loads and increase the reliability of the piping/support system.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which.

DETAILED DESCRIPTION OF THE PREFERRED EMBODIMENTS

Figure 1:
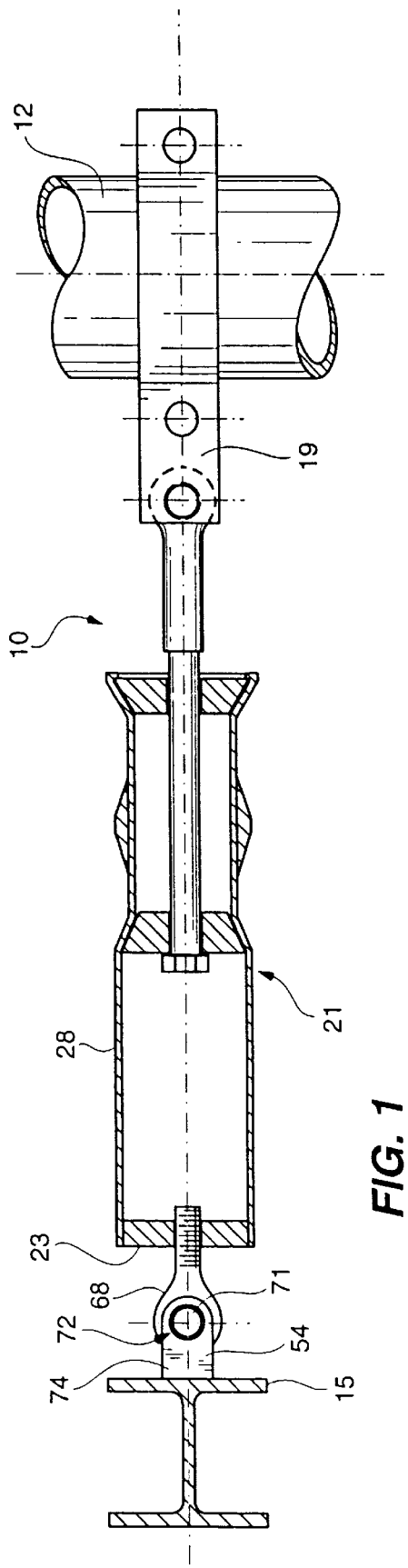
FIG. 1 is a fragmentary plan view of a restraint system, which is constructed in accordance with the present invention.
Figure 3:
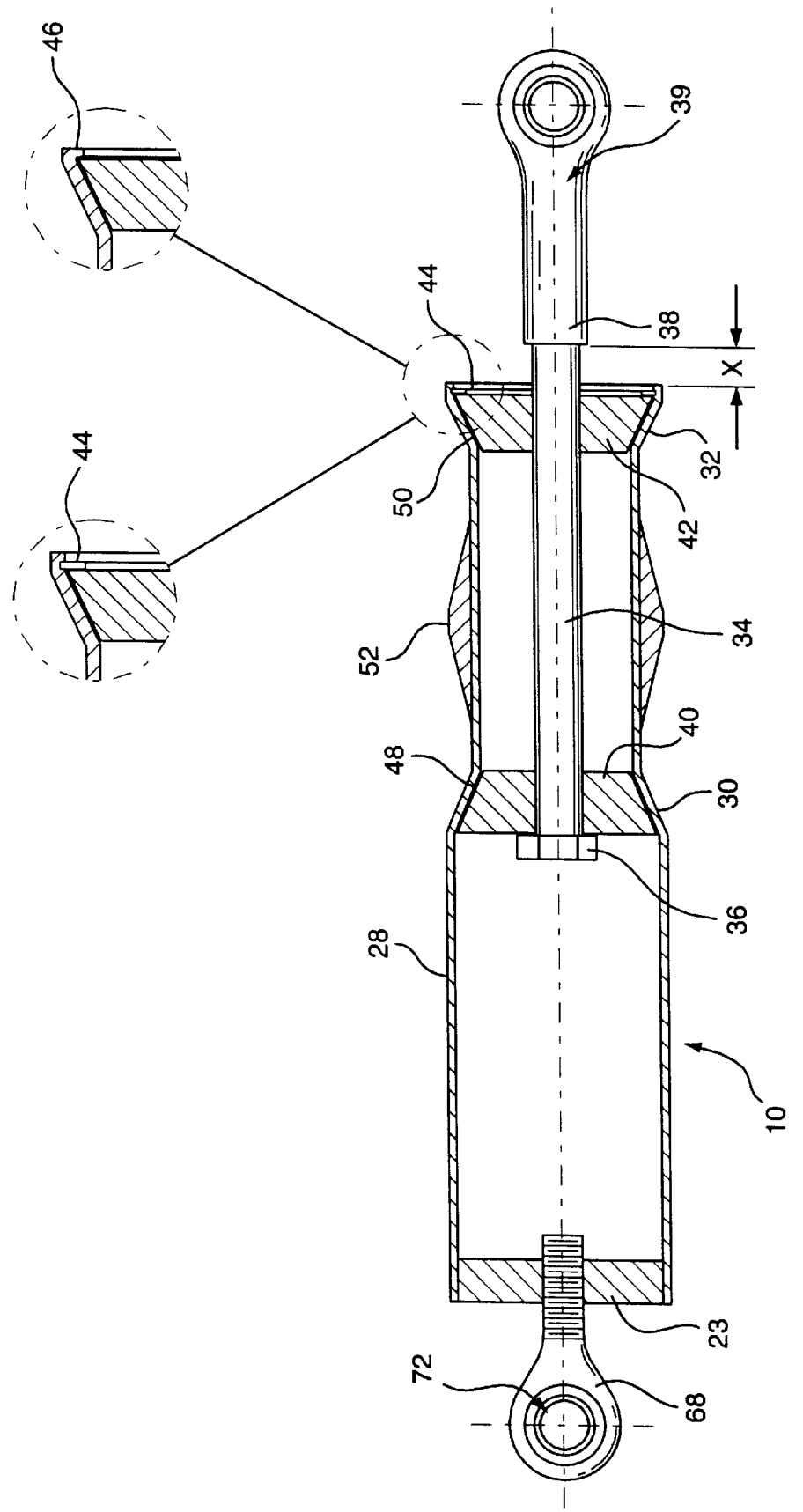
FIG. 3 is a cross sectional view of one embodiment of a pipe restraint constructed in accordance with the present invention.

Referring now to the drawings, and more particularly to FIGS. 1 and 3 thereof, there is shown a pipe restraint 10 which is constructed in accordance with the present invention, and which is shown attached to a pipe 12. The restraint 10 limits movement of the pipe 12 should a dynamic event, such as an earthquake, occur.

The pipe restraint 10, as hereinafter described in greater detail, includes a clamp 19 which is attached to pipe 12 and a radially-extending load limiting device 21 connected between the clamp 19 and the building structure 15.

Figure 2:
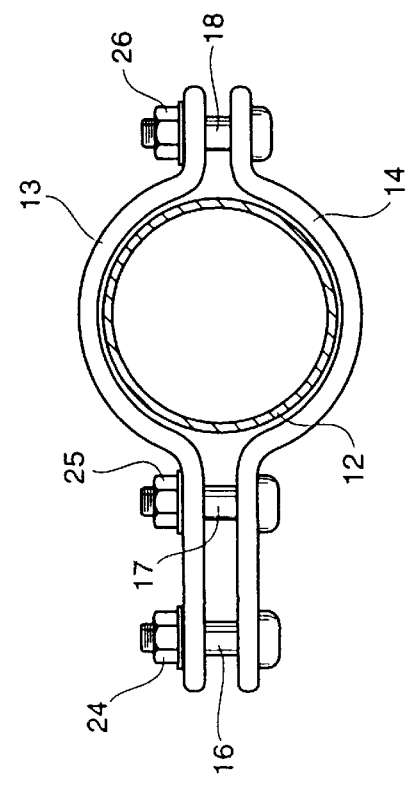
FIG. 2 is a plan view of one type of clamp that may be used in the restraint system of the present invention.

FIG. 2 shows one type of clamp 19 that may be used to attach the load limiting device 21 to the pipe 12. The clamp shown in FIG. 2 is commonly referred to as a double bolt pipe clamp and includes two opposing straps 13, 14, each defining a half-moon shape for receiving at least a portion of pipe 12. The two opposing straps 13, 14 are held together about pipe 19 by bolts 16, 17, 18 and nuts 24, 25, 26. It should be understood that other types of pipe attachments known to those of ordinary skill in the art may also be used in pipe restraint 10.

The load limiting device 21 includes a generally cylindrical outer tube 28 having a pair of axially spaced-apart internal shoulders 30 and 32 which are transitions between outer larger diameter portions of the tube 28 and a central restricted diameter portion. Endplate 23 defines a threaded hole adapted for use in attaching the load limiting device 21 to building structure 15, as will be described in detail below.

Figure 4:
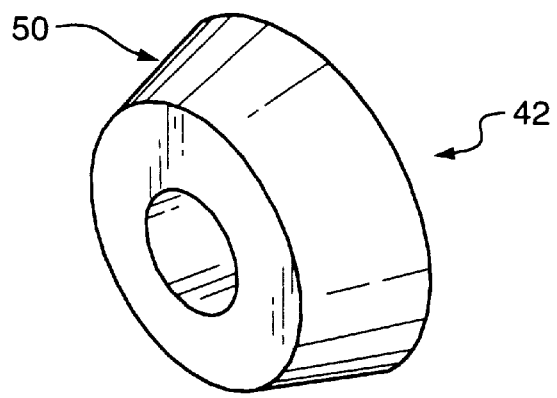
FIG. 4 is a perspective view of a wedge of one embodiment of the invention.

An inner concentric shaft 34 is slidably mounted for free movement within outer tube 28 in a telescoping manner. Cap 36 of the inner shaft 34 is disposed within the outer tube 28 at the left end enlarged portion thereof as viewed in FIG. 3 of the drawings. Enlarged shaft portion 38 of the shaft 34 is disposed outside of the outer tube 28 to the right of the end of the tube 28 as viewed in FIG. 3 of the drawings and includes a spherical rod end 39, which allows for universal rotation and through which bolt 16 of clamp 19 is received. A pair of annular wedge members 40 and 42 surround freely the shaft 34 and are disposed between the respective enlarged portions 36 and 38 and the internal annular shoulders 30 and 32, respectively. The wedge members 40 and 42 include a pair of tapered surfaces 48 and 50, respectively, for engaging the complementary-shaped inclined surfaces of the respective shoulders 30 and 32. A perspective view of wedge member 42 is shown in FIG. 4, it being understood that wedge member 40 is of the same general shape.

Preferably tube 28 is made of mild steel or austinitic stainless steel for maximum ductility and wedges 40 and 42 are made of a much harder material such as tool steel or martinsitic stainless steel. However, other types of materials can also be used. The thickness of tube 28 varies depending on the particular environment in which the restraint 10 is placed. In one embodiment, tube 28 has a thickness of 0.125 inches when an anticipated force resulting from a seismic or other dynamic event is approximately 1180 pounds, excluding frictional forces. In one preferred embodiment, where tube 28 has a thickness of 0.125 inches, the tapers of wedges 40 and 42 are between approximately 10° and 20°. It should be understood that the tapers of wedges 40 and 42 may be of different angles or the same angle. It should also be understood that where a larger thickness is employed for tube 28, then, preferably, the angles of the tapers of wedges 40 and 42 are reduced; and, conversely, where a smaller thickness is employed for tube 28, then, preferably, the angles of the tapers of wedges 40 and 42 are increased.

Wedge 42 is retained within tube 28 by retaining means, such as snap ring 44 or by rolling the end of tube 28, as shown at 46. Snap ring 44 defines an aperture sufficiently large to allow one end of enlarged shaft portion 38 to pass therethrough and impact wedge 42. Snap ring 44 is received by a slot extending about the inner circumference of the end of tube 28. Alternatively, snap ring 44 may be threaded and screwed into the end of tube 28. Use of snap ring 44 would be most appropriate when the thickness of tube 28 is such that a sufficiently deep groove might be easily machined into the inner circumference of the tube 28. In all other instances, it would be most appropriate to roll the end of tube 28 over the outer edge of the wedge 42. Preferably snap ring 44 is made of high strength steel.

Figure 6:
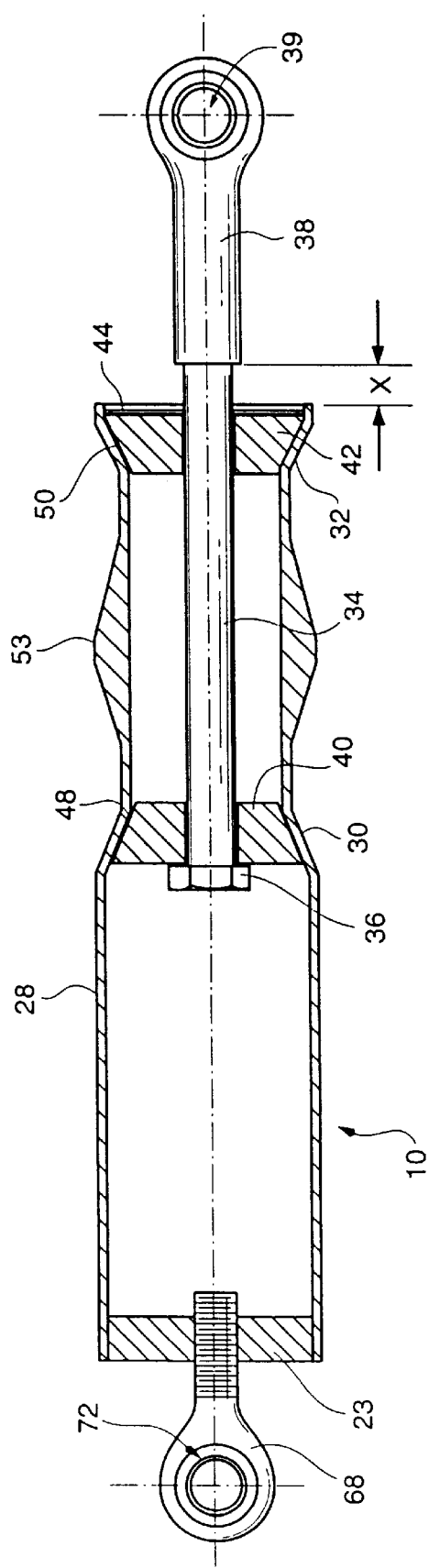
FIG. 6 is a cross sectional view of an alternate embodiment of a pipe restraint constructed in accordance with the present invention.

Reinforcement means, such as heavy stop ring 52, is attached to the outer circumference of tube 28, between shoulders 30 and 32, and acts as a positive or safety stop so that restraint 10 does not come apart when subject to extreme loads. It should be understood that the resistance to movement of wedge members 40, 42 by the reinforcement means is substantially greater, i.e., at least two times greater, than the resistance to movement in the area adjacent to the reinforcement means. Stop ring 52 may be made of the same material as tube 28 or other similar materials and is generally tapered on either side, preferably at a low angle of approximately 15° or less, so there will not be a sudden increase in the rigidity of the unit from the normal limit load to the ultimate capacity. The device will continue to yield, absorbing energy at ever increasing load magnitudes as wedge 40 or 42 is driven into the stop section until the total cross sectional area being plastically strained reaches that which would generate the ultimate capacity of the restraint. Load limiting device 21 is normally designed so that the maximum displacement of the device 21 would not engage stop ring 52. The stop ring 52 functions to provide an additional safety margin. Because of the taper of the stop ring 52, the load limit on the device will be no higher than what is needed to mitigate the effects of the dynamic event. It should be understood that stop ring 52 could also be used without one or both tapers. Instead of stop ring 52, the reinforcement means may take the form of the wall thickness of tube 28 being constructed to reflect the additional thickness stop ring 52 would have provided, whether tapered or not. In FIG. 6, where reference numbers identical to those in FIG. 3 refer to the same elements, an embodiment of the present invention using one type of thickened wall 53 is shown.

Figure 8:
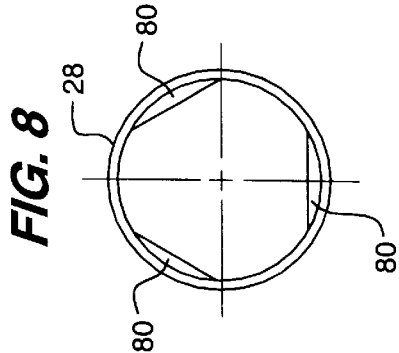
FIG. 8 is a cross sectional view of an outer tube of the pipe restraint of FIG. 7.
Figure 7:
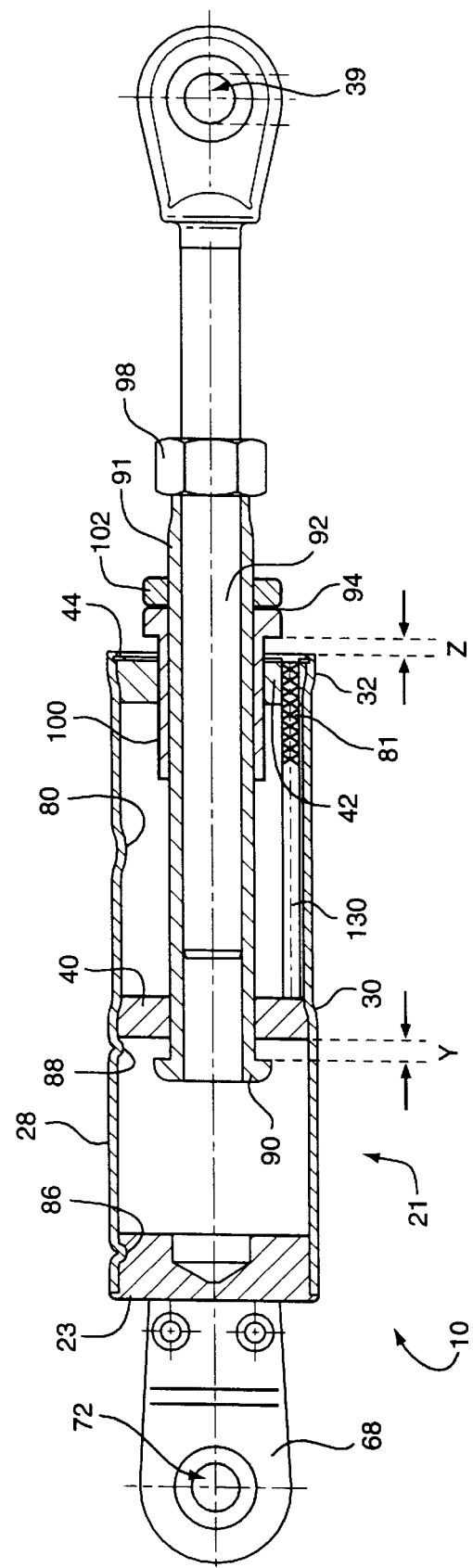
FIG. 7 is a cross sectional view of an alternate embodiment of a pipe restraint constructed in accordance with the present invention.

As shown in FIGS. 7 and 8, where reference numbers identical to those in FIG. 3 refer to the same elements, the reinforcement means may also take the form of dimples or indentations 80 in the tube 28. Preferably three dimples 80 are spaced approximately 120° apart around the circumference of the tube 28. The dimples 80 reduce the effective diameter of the tube 28 at the point where the safety stop is desired. The device will continue to yield at ever increasing load magnitudes as wedge 40 or 42 is driven into the stop section until the total cross sectional area being plastically strained reaches that which would generate the ultimate capacity of the restraint. Load limiting device 21 is normally designed so that the maximum displacement of the device 21 would not engage the dimples 80. The dimples 80, like the stop ring 52, function to provide an additional safety margin.

It should be understood that different numbers and orientations of dimples may be used. For example, more than three dimples may be used, e.g., four dimples spaced 90° apart, or less than three dimples may be used, e.g., two substantially diametrically opposed dimples.

The reinforcement means may take on other forms, such as one or more rods passing into the hollow area of tube 28, between shoulders 30 and 32. Such a rod or rods would be positioned so as not to interfere with the travel of shaft 34 of FIGS. 3 and 6 or sleeve 91 of FIG. 7. Such rod or rods may pass from one portion of the wall of tube 28 to another or may just extend into the hollow area of tube 28. If multiple rods are used, they may be equally or unequally spaced around the circumference of tube 28.

The reinforcement means may be any type of obstruction placed within the hollow area of tube 28 between the shoulders 30 and 32 which resists movement of wedge members 40, 42 at a value substantially greater, i.e., at least two times greater, than the resistance to movement in the area immediately adjacent to the reinforcement means.

Figure 5:
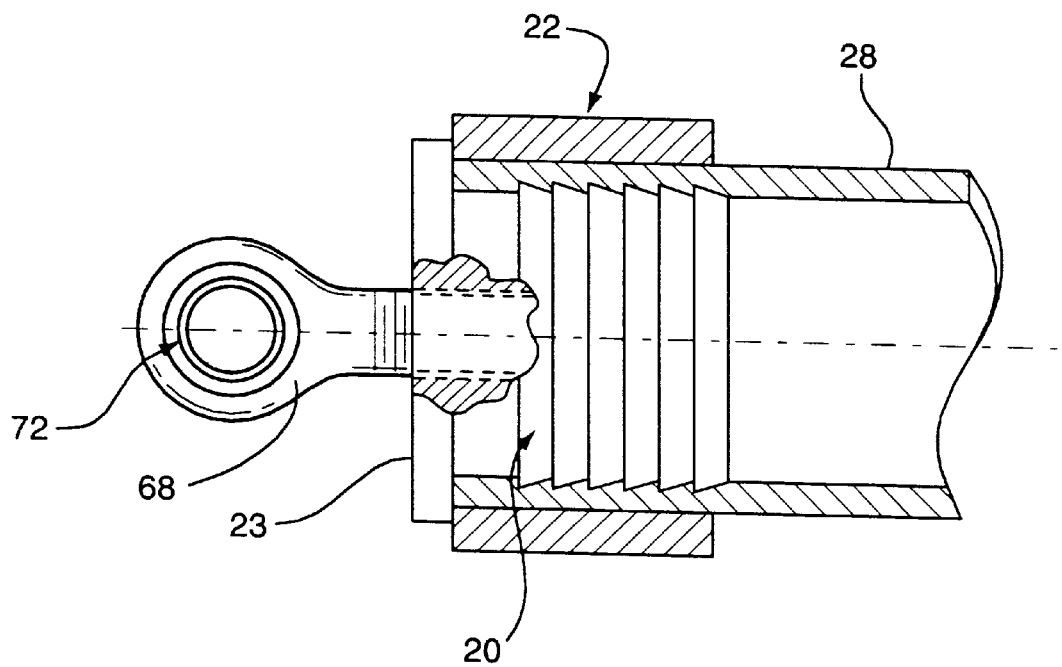
FIG. 5 is a partial plan view of an end fitting of one embodiment of the present invention.

FIG. 5 illustrates one method by which endplate 23 can be attached to tube 28, wherein endplate 23 is part of an end fitting 20 which includes tooth-type grooves with an outer diameter larger than the inner diameter of the tube 28. A doubler ring 22 is placed on the end of tube 28 with a very tight fit. The end of tube 28 is heated or conversely, the end fitting 20 may be chilled and the end fitting 20 is inserted into the tube 28; thus, upon cooling, achieving a shrink fit between end fitting 20 and tube 28 adequate to sustain the maximum load on the device 21. Alternatively, end fitting 20 could be simply threaded into tube 28 or the parts could be welded together.

Another method by which endplate 23 can be attached to tube 28 is shown in FIG. 7. Dimples or indentations 86 may be provided to secure the endplate 23 within the end of the tube 28. Preferably dimples or indentations 86 are spaced approximately 120° apart around the circumference of the tube 28. It should be understood that a different number of or a different orientation of the dimples 86 may be used. For example, two substantially diametrically opposed dimples 86 may be used or four dimples 86 spaced approximately 90° apart may be used.

As also shown in FIG. 7, dimples or indentations 88 may be provided to retain wedge member 40 to prevent wedge member 40 from moving within the tube 28 in a direction away from shoulder 30. Preferably three dimples or indentations 88 are spaced approximately 120° apart around the circumference of the tube 28. However, more or less than three dimples 88 may be used as described above with respect to the endplate 23. Similarly, the spacings or configuration of the dimples 88 may be varied.

Referring now to FIG. 5, rod end 68 is threaded into endplate 23 of load limiting device 21. As shown in FIG. 1, rod end 68 is connected to bracket 54 by means of pin 71 which extends through a spherical rod end 72, which allows for universal rotation, and through aligned holes of a pair of clevis plates, only one of which is shown in FIG. 1 as 74. Bracket 54' is connected to an immovable support structure or wall 15. In this way the load limiting device 21 is able to take up energy along the longitudinal axis of the device 21.

During normal operation, the inner shaft 34 is free to move axially and slidably back and forth within the outer tube 28 through a distance X, which is a distance of free travel or movement between the respective enlarged portions 36 and 38 and the wedge members 40 and 42, respectively, when they are disposed in engagement with the respective annular shoulders as shown in FIG. 3. This freedom of movement accommodates movement of the pipe 12 due to normal thermal expansion and the like. In some applications, the load limiting device may be designed such that distance X is zero, such that there is no free travel or movement between the respective enlarged portions 36 and 38 and the wedge members 40 and 42. In such applications, load limiting device 21 will immediately absorb energy due to any type of movement. As those of ordinary skill in the art will appreciate, depending on the placement of the load limiting device 21 relative to clamp 19 and bracket 54, the free travel or movement may not be unidirectional, as shown in FIGS. 1 and 2. The free travel or movement could be bidirectional and possibly greater in one direction than another.

When a large enough dynamic event, such as a large enough seismic event, occurs, the resulting force causes pipe 12 to move and, consequently, movement occurs in the load limiting device 21 of the restraint 10. After the free travel is used, the device 21 is either placed in tension or compression. The inner shaft 34 of the device 21 moves axially with deformation of outer tube 28 occurring until the inner shaft 34 comes to a rest position. In so doing, the restraint 10 assumes a lengthened or shortened configuration to absorb the energy produced by the dynamic event. It will be appreciated that pipe loads acting on the device 21 below a predetermined amount will not cause wedge members 40 or 42 to move, and the device 21 will not absorb energy. Further, the maximum device load from pipe 12 will be limited to that predetermined amount unless the stop ring 52 is engaged. The predetermined amount is based on the size, materials and configuration of the load limiting device 21.

More particularly, when a seismic or other dynamic force occurs to produce a large enough relative movement between the inner shaft 34 and the outer tube 28, one of the enlarged portions 36 or 38 moves through a distance of free movement into engagement with its wedge member 40 or 42 to carry it forcibly into engagement with the corresponding internal annular shoulder 30 or 32 of the outer tube 28. Thereafter, the wedge member 40 or 42 is moved forcibly in an axial direction relative to the shoulder 30 or 32, deforming the tube 28 radially outwardly in either a plastic or an elastic manner until the inner shaft 34 and the outer tube 28 come to rest relative to one another.

In the embodiment of the device 21 shown in FIG. 7, structure is provided to adjust the total amount of free travel or movement of the device 21. The total amount of free travel is the sum of the distance between an enlarged portion 90 of a first inner sleeve member 91 and wedge member 40 (distance Y) and the distance between an enlarged portion 94 of a second or outer sleeve member 100 and wedge member 42 (distance Z).

An inner shaft 92 has a threaded outer surface. The first, inner sleeve member 91 has threaded inner and outer surfaces and is threaded onto the inner shaft 92. A jam nut 98 is also threaded onto the inner shaft 92 and locks the position of the first inner sleeve member 91 relative to the inner shaft 92.

The second or outer sleeve member 100 has a threaded inner surface and is threaded onto the first sleeve member 91. The second sleeve member 100 is locked in place relative to the first sleeve member 91 by a second jam nut 102 which is threaded onto the first sleeve member 91.

By adjusting the position of the second sleeve member 100 relative to the first sleeve member 91, the total amount of free travel (distance Y + distance Z) may be varied. When a force is applied to the device 21, the inner shaft 92, first sleeve member 91 and second sleeve member 100 move together, as a unit, relative to the outer tube 28. If the force is large enough, and, depending on whether the force places the device 21 in tension or compression, one of the enlarged portions 90 or 94 will engage one of the wedge members 40 or 42 and cause the respective wedge member 40 or 42 to move forcibly relative to its respective shoulder 30 or 32 and cause either elastic or plastic deformation of the tube 28 as described above with respect to FIG. 3.

Preferably, load limiting device 21 is attached to pipe 12 at a point where the anticipated unrestrained movement of the pipe 12 due to a seismic event, is greater than the anticipated normal unrestrained or anticipated desired restrained thermal movement of pipe 12 at such point. Determination of the anticipated unrestrained movement of pipe 12 due to a seismic or other dynamic event and the anticipated thermal movement of pipe 12 can be calculated using various techniques that are well known to those of ordinary skill in the art. However, load limiting device 21 may also be placed at other points along pipe 12. Preferably, in practice, it is anticipated that an existing snubber may be replaced by load limiting devices such that existing pipe clamps and wall brackets may be used, provided that the preceding relationship between anticipated thermal movement and anticipated seismic movement is met.

Considering now the limiting load developed by the restraint 10, the following is an equation which defines, ignoring friction, the inter-relationship of the unit load and the deformation of the load limiting device 21:

$$P \cdot \Delta = S_p \cdot \epsilon_p \cdot V$$

where:

P is unit load $\Delta$ is displacement of wedge 40 or 42

$S_p$ is plastic stress $\epsilon_p$ is plastic strain

V is volume of material strained

Since $V \approx \pi \cdot D \cdot t \cdot \Delta$ where t is the thickness of the tube 28;
then, $$P = \pi \cdot D \cdot t \cdot S_p \cdot \epsilon_p$$

However, $$\epsilon_p = \delta D/D$$

where $\delta D$ is the increase in diameter of tube 28.
Therefore, $$P = \pi \cdot t \cdot \delta D \cdot S_p$$

For example, where a tube 28 having a diameter of 1.5 inches and a wall thickness of 0.125 inches is used, and the increase in diameter is 0.05 inches and the plastic stress is 60,000 psi, then, $$P = \pi \cdot (0.125) \cdot (0.050) \cdot (60,000)$$

P=1180 lbs.

Since frictional forces are not included, the actual load will be slightly higher than 1180 lbs.

Figure 9:
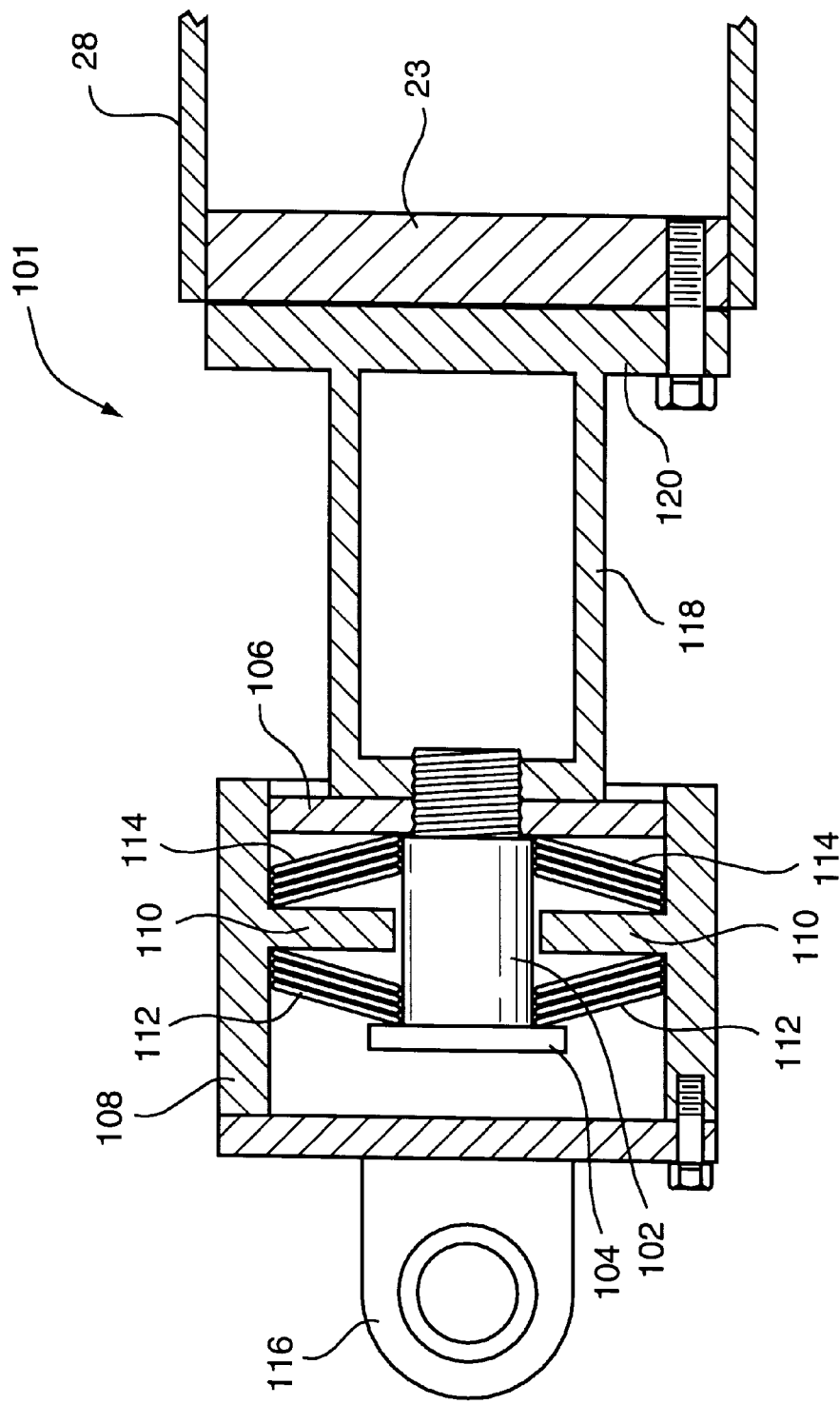
FIG. 9 is a cross sectional view of a disc spring assembly that may be used in the restraint system of the present invention.

Referring now to FIG. 9, a disc spring assembly 101 may be attached to one end of the load limiting device 21, preferably to endplate 23. Disc spring assembly 101 includes a shaft 102 with a flange 104. The shaft 102 is threaded into a plate 106. The shaft 102 and plate 106 are received by housing 108 which includes dividing wall 110, which defines an opening through which shaft 102 passes. In a preferred embodiment, housing 108 is generally cylindrical.

Two sets of disc springs 112, 114 are layered around the shaft 102 on either side of the dividing wall 110. Preferably disc springs 112, 114 are Belleville-type disc springs, which are well known to those skilled in the art. In one embodiment, each set of disc springs 112, 114 contains 4 disc springs; however, the number of disc springs in each set may be adjusted to obtain the desired elastic spring characteristics. It is not necessary that the number of disc springs in set 112 equal that in set 114. The disc springs 112, 114 are held in place by the plate 106 and the flange 104, respectively. The plate 106 is not fixed to the housing 108 and moves with the shaft 102. A universal joint 116 is located at the closed end of the disc spring assembly 101 and is used to connect the disc spring assembly 101 to a fixed structural member, such as a building wall.

As shown in FIG. 9, disc spring assembly 101 is attached to endplate 23 via extension 118, it being understood that disc spring assembly 101 could also be attached directly to end plate 23 such that end plate 23 and a portion of tube 28 are received by housing 108. Extension 108 includes extension plate 120 which is bolted to end plate 23.

The disc spring assembly 101 is used to reduce impact loads prior to axial movement of the wedges 16, 18 which would deform the cylinder wall. In operation, relative movement between the cylinder and the building wall causes plate 106 and shaft 102 to move in a compressed direction or in an extended direction. In the compressed direction, springs 114 deflect and in the extended direction, springs 112 deflect.

When a small load is applied to the load limiting device 21 or before plastic deformation of the device 21 occurs, the disc spring assembly 101 provides a cushion to store the light amounts of energy which are created when the enlarged portions 36 or 38 (FIGS. 3 and 6) or enlarged portions 90 or 94 (FIG. 7) engage the wedge members 42 or 40. When such a small load is applied to the device 21, one of the two sets of discs 112, 114 tend to flatten out thus storing sufficient energy to mitigate the effects of any light loads that the device 21 may encounter.

If such a light load places the device 21 in compression, the discs 114 are forced toward and tend to flatten against dividing wall 110 by plate 106. If the light load places the device 21 in tension, the discs 112 are forced toward and tend to flatten against dividing wall 110 by flange 104 of shaft 102. After the discs 112 or 114 completely flatten out, the device 21 will absorb heavy impacts as previously described.

Figure 10:
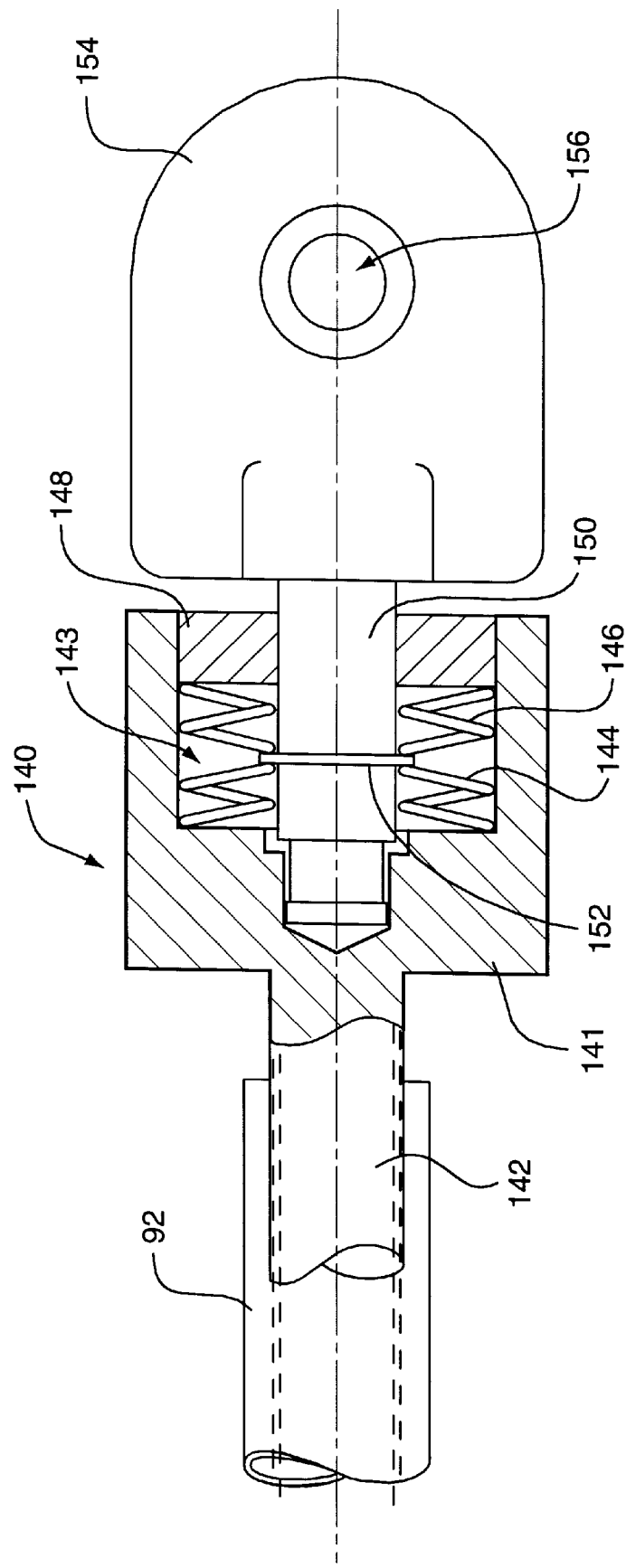
FIG. 10 is a partial cross sectional view of another disc spring assembly that may be used in the restraint system of the present invention.

The same effects of disc spring assembly 101 can also be achieved by disc spring assembly 140, shown in FIG. 10. Disc spring assembly 140 is attached to shaft 92 between the pipe 12 and the shaft 92 and includes a housing 141 defining a bore 143 for receiving two sets of disc springs 144 and 146. Rod 142 extends from housing 141 and is threaded into or otherwise attached to shaft 92. Preferably each set of disc springs 144 and 146 are Belleville-type disc springs placed in opposing relationship. However, other orientations or other similar types of springs well known to those of skill in the art may be used.

As shown in FIG. 10, each set of disc springs 144 and 146 has three disc springs, although the number of disc springs in either set may be varied to obtain the desired elastic spring characteristics. Cap 148 is secured in housing 141 to retain the disc springs 144 and 146 within the housing 141. Shaft 150 is received through a hole in cap 148 and includes a ridge 152 integral therewith. The ridge 152 separates the two sets of disc springs 144 and 146. The shaft 150 is capable of limited free movement within housing 141 and is attached to coupling 154 with universal joint 156, which is, in turn, attached to the pipe 12 via clamp 19 or a similar type of device.

In compression, ridge 152 engages disc springs 144, thus tending to flatten such springs. In extension, ridge 152 engages springs 146, thus tending to flatten those springs.

Alternatively, the disc spring assembly 101 could be used in place of disc spring assembly 140 and vice versa. Also disc spring assemblies could be placed at both the location shown and FIG. 9 and the location shown in FIG. 10.

It will become apparent to those skilled in the art that more than one load limiting device may be employed at a single location on a pipe with an appropriate clamp for certain applications, if desired. Also, markings may be placed on the outside of tube 28, or other means may be used, to visually indicate the amount of axial movement of the load limiting device 21 or components thereof, to aid in the inspection and servicing of the load limiting device 21. As shown in FIG. 7, markings 80 may also be placed on an elongated member 130 which is threaded into wedge member 40. Wedge member 42 has a bore therein through which the elongated member 130 can pass.

When the device 21 is deformed by a compressive force, the wedge member 42 is moved toward the second wedge member 40. As the wedge member 42 is moved, the elongated member 130 extends through the bore in wedge member 42 and the markings 80 can be easily seen and measured to determine the amount of relative axial movement between wedge member 40 and wedge member 42. It will be understood by one of ordinary skill in the art that the amount of energy absorbed by the device 21 can be easily determined by the amount of relative axial movement between the two wedge members.

When the device 21 is placed in tension, wedge member 40 and the elongated member 130 are moved toward wedge member 42. As the wedge member 40 and elongated member 130 are moved, the elongated member 130 extends through the bore in wedge member 44 and the markings 80 can be easily seen and measured by a person to determine the amount of axial movement of the device 21.

The load limiting device described above is useful for limiting the effects of dynamic loads, such as seismic loads. In addition, the free movement of the pipe before engagement of the restraint defined by the gap x of FIG. 3 and 6 or the sum of gaps y and z of FIG. 7 may be adjusted to limit the effects of static loads, such as thermal loads. As used herein, "static loads" includes loads that change slowly, such as thermal loads in a power plant setting.

In nuclear power plants, thermal loading of piping is a small concern, but seismic loading is a major concern. Therefore, the gap is preferably set to be larger than the anticipated movement due to thermal loading. In fossil power plants, however, static loads, such as thermal loads, are more of a concern. Therefore, the gap is set to be smaller than the anticipated movement of the pipe due to static loads such as thermal loads. In some fossil power plant applications, the gap can be set to zero. It is contemplated that the static loads will not be of a magnitude great enough to cause the wedge members, 40 and 42 to deform tube 28. In this way the load limiting device acts like a classic limit stop. However, in the event of a large static or dynamic load, the tube 28 will be deformed by one or both wedge members. Such deformation prevents failure of the device and/or supporting structure, as might occur with a classic limit stop.

By using universal joints or pin joints at both ends the gapped restraint, the gapped restraint will not be subject to significant forces, such as frictional forces, due to the movement of the pipe, that are perpendicular to the restraint's longitudinal axis. In such a case, the restraint can accommodate both axial and lateral movement of the pipe. Generally, a nonsignificant force would be less than 1% of the restraint design force.

Although only several types of gapped restraints have been discussed herein, other well-known types of gapped restraints could also be used in either a nuclear setting or a fossil setting.

While various forms and modifications have been described above and illustrated in the drawings, it will be appreciated that the invention is not limited thereto but encompasses all variations and expedients within the scope of the following claims. Although the load limiting device of the invention has been described in connection with its use to provide restraint during the occurrence of seismic phenomena, it should be understood that the load limiting device could also be used for other dynamic loads, such as fluid transient loads or loads from a postulated pipe break, as well as static loads, such as thermal loads. In addition, the load limiting device may be used with other equipment or components besides piping.

What is claimed is:

1. A load limiting device comprising:

a housing defining a generally cylindrical hollow portion and including a wall defining an inner surface, an outer surface and multiple diameters;

said wall including a first shoulder at a first location where the diameter of said wall changes and a second shoulder at a second location where the diameter of said wall changes;

a shaft at least partially received by said housing;

said shaft including a first wedge defining a first angled surface and a second wedge defining a second angled surface;

said first and second wedges received by said housing and movable within said housing;

one of said housing and said shaft being connected to an object subject to displacement relative to a support structure and the other of said housing and said shaft being connected to said support structure;

means, located between said first shoulder and said second shoulder, for resisting the movement of said first and second wedges in the region of said housing defined between said first shoulder and said second shoulder;

said resisting means having a first resistance in a first region adjacent said first shoulder, a second resistance in a second region adjacent said second shoulder and a third resistance in a third region between said first region and said second region, said third resistance being substantially greater than said first resistance and said second resistance; and said first angled surface of said first wedge engaging said first shoulder and plastically deforming said wall once a predetermined amount of relative force has been imparted between said first wedge and said first shoulder and said second angled surface of said second wedge engaging said second shoulder and plastically deforming said wall once a predetermined amount of relative force has been imparted between said second wedge and said second shoulder.

2. The load limiting device of claim 1 wherein said resisting means includes at least one indentation in said wall.

3. The load limiting device of claim 2 wherein said resisting means includes multiple indentations in said wall.

4. The load limiting device of claim 3 wherein said multiple indentations are spaced equally about the circumference of said wall.

5. A load limiting device comprising:

a housing defining a generally cylindrical hollow portion and including a wall defining an inner surface, an outer surface and multiple diameters;

said wall including a first shoulder at a first location where the diameter of said wall changes and a second shoulder at a second location where the diameter of said wall changes;

a disc spring assembly attached to said housing;

a shaft at least partially received by said housing;

said shaft including a first wedge defining a first angled surface and a second wedge defining a second angled surface;

said first and second wedges received by said housing and movable within said housing;

one of said housing and said shaft being connected to an object subject to displacement relative to a support structure and the other of said housing and said shaft being connected to said support structure;

means, located between said first shoulder and said second shoulder, for resisting the movement of said first and second wedges in the region of said housing defined between said first shoulder and said second shoulder;

said resisting means having a first resistance in a first region adjacent said first shoulder, a second resistance in a second region adjacent said second shoulder and a third resistance in a third region between said first region and said second region, said third resistance being substantially greater than said first resistance and said second resistance; and said first angled surface of said first wedge engaging said first shoulder and plastically deforming said wall once a predetermined amount of relative force has been imparted between said first wedge and said first shoulder and said second angled surface of said second wedge engaging said second shoulder and plastically deforming said wall once a predetermined amount of relative force has been imparted between said second wedge and said second shoulder.

6. The load limiting device of claim 5 wherein said disc spring assembly includes first and second sets of one or more disc springs.

7. A load limiting device comprising:

a housing defining a generally cylindrical hollow portion and including a wall defining an inner surface, an outer surface and multiple diameters;

said wall including a first shoulder at a first location where the diameter of said wall changes and a second shoulder at a second location where the diameter of said wall changes;

a shaft at least partially received by said housing;

a disc spring assembly attached to said shaft;

said shaft including a first wedge defining a first angled surface and a second wedge defining a second angled surface;

said first and second wedges received by said housing and movable within said housing;

one of said housing and said shaft being connected to an object subject to displacement relative to a support structure and the other of said housing and said shaft being connected to said support structure;

means, located between said first shoulder and said second shoulder, for resisting the movement of said first and second wedges in the region of said housing defined between said first shoulder and said second shoulder;

said resisting means having a first resistance in a first region adjacent said first shoulder, a second resistance in a second region adjacent said second shoulder and a third resistance in a third region between said first region and said second region, said third resistance being substantially greater than said first resistance and said second resistance; and said first angled surface of said first wedge engaging said first shoulder and plastically deforming said wall once a predetermined amount of relative force has been imparted between said first wedge and said first shoulder and said second angled surface of said second wedge engaging said second shoulder and plastically deforming said wall once a predetermined amount of relative force has been imparted between said second wedge and said second shoulder.

8. The load limiting device of claim 7 wherein said disc spring assembly includes first and second sets of one or more disc springs.

9. A method for using a gapped restraint to restrain a pipe subject to unrestrained displacement due to static loading in a mechanical system, said gapped restraint having first and second ends and defining a longitudinal axis, said method comprising the following steps:

(a) determining said unrestrained displacement of said pipe at a selected point due to said static loading and (b) attaching said gapped restraint between said pipe and a fixed structural member at said selected point to reduce said unrestrained displacement along said longitudinal axis such that said gapped restraint is not subject to significant forces, due to displacement of said pipe caused by said static loading, that are perpendicular to said longitudinal axis.

10. The method of claim 9 wherein said attaching step includes using a universal joint between said first end of said gapped restraint and said pipe.

11. The method of claim 10 wherein said attaching step includes using a universal joint between said second end of said gapped restraint and said fixed structural member.

12. The method of claim 11 wherein said attaching step includes using a universal joint to directly attach said first end of said gapped restraint to said pipe.

13. The method of claim 12 wherein said attaching step includes using a universal joint to directly attach said second end of said gapped restraint to said fixed structural member.

14. The method of claim 9 wherein said attaching step includes attaching a gapped restraint between a pipe and said fixed structural member.

15. The method of claim 9 wherein said determining step includes determining said unrestrained displacement of said pipe at a selected point due to thermal loading.

* * * * *